(12) United States Patent
Volchegursky et al.

(10) Patent No.: US 9,304,765 B1
(45) Date of Patent: Apr. 5, 2016

(54) METHOD AND SYSTEM FOR TRACKING CHANGES TO APPLICATION MODEL DEFINITIONS FOR APPLICATION MODEL MIGRATION

(71) Applicant: EMC Corporation, Hopkinton, MA (US)

(72) Inventors: Dmitry Volchegursky, Pleasanton, CA (US); Dmitry Limonov, Dublin, CA (US); Boris Shpilyuck, Dublin, CA (US); Alex Rankov, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 296 days.

(21) Appl. No.: 13/785,067

(22) Filed: Mar. 5, 2013

(51) Int. Cl.
*G06F 9/44* (2006.01)

(52) U.S. Cl.
CPC .................................. *G06F 8/71* (2013.01)

(58) Field of Classification Search
None
See application file for complete search history.

(56) References Cited

U.S. PATENT DOCUMENTS

| | | | | |
|---|---|---|---|---|
| 5,799,308 A * | 8/1998 | Dixon | G06F 17/30 | 707/812 |
| 5,933,139 A * | 8/1999 | Feigner | G06F 9/446 | 715/708 |
| 7,703,074 B2 * | 4/2010 | Kamen | G06F 8/60 | 717/122 |
| 7,814,459 B2 * | 10/2010 | Behnen | G06F 17/30569 | 707/602 |
| 8,418,138 B2 * | 4/2013 | Sriramadhesikan | G06F 8/71 | 717/121 |
| 8,521,699 B2 * | 8/2013 | Kureshy | G06F 17/30368 | 707/687 |
| 8,601,121 B2 * | 12/2013 | Kumar | G06F 11/302 | 707/610 |
| 8,843,889 B2 * | 9/2014 | Anderson | G06F 8/70 | 717/120 |
| 2008/0256432 A1 * | 10/2008 | Sambandam | G06Q 10/00 | 715/212 |
| 2009/0100410 A1 * | 4/2009 | Pouliot | G06F 8/75 | 717/122 |
| 2013/0332430 A1 * | 12/2013 | Margalit | G06F 11/3476 | 707/695 |
| 2015/0199197 A1 * | 7/2015 | Maes | G06F 8/71 | 717/122 |
| 2015/0199270 A1 * | 7/2015 | Day-Richter | G06F 12/0253 | 707/816 |

* cited by examiner

*Primary Examiner* — Wei Zhen
*Assistant Examiner* — Hossain Morshed
(74) *Attorney, Agent, or Firm* — Dergosits & Noah LLP; Todd A. Noah

(57) ABSTRACT

Tracking changes to application model definitions for application model migration is described. A combined history file is created based on changes associated with application model definition files. A first property for a first model definition file of the application model definition files is identified that depends on a second property for a second model definition file of the application model definition files. A change for the second property is identified based on the combined history file. A transformation file is constructed that includes a change for the first property based on the change for the second property.

18 Claims, 3 Drawing Sheets

METHOD AND SYSTEM FOR TRACKING CHANGES TO APPLICATION MODEL DEFINITIONS FOR APPLICATION MODEL MIGRATION

BACKGROUND

Current software development methods use modeling frameworks and code generation facilities for building applications based on structured data models. Modeling frameworks provide tools to produce a set of classes for data models along with a set of adapter classes that enable viewing and editing of the data models. Software developers use modeling frameworks to create an application model for each software version. An application model's data models, which may number in the dozens, may have a very complex structure and extremely complex relationships, especially when some data models extend other data models. Therefore, upgrading an application model from one software version to another software version may become a complex and difficult task.

Prior art tools can properly migrate data models from one software version to another software version for only a limited set of data model relationships. In a very simple example, an application model for a human resources application has two data model definition files, a model 1 definition file and a model 2 definition file, with each model definition file capable of producing their own instances. The model 1 definition file is for employee data, and includes a property A for an employee's name and a property B for the employee's spouse's name. The model 2 definition file extends the model 1 definition file for the purpose of associated health insurance data. The model 2 definition file extends the property A from the model 1 definition file for the employee's health insurance plan, extends the property B from the model 1 definition file for the employee's spouse's health insurance plan, includes a property C for employer contributions to any employee-selected health insurance plans, and includes a property D for the employee's contributions to any employee-selected health insurance plans. Subsequently, the model 1 definition file's property B for the employee's spouse's name is changed to a property G for the employee's family members' names, and the model 2 definition file's property C for employer contributions to any employee-selected health insurance plans is changed to a property F for federally-mandated employer contributions to any employee-selected health insurance plans. When the human resources application references a model 2 instance, the second property for the model 2 instance references the new property G for the employee's family members' names because the second property of the model 2 instance extends the second property of the model 1 definition file, which was changed to the new property G for the employee's family members' names. Prior art tools record the change to the model 1 definition file in a model 1 history file that is separate from the model 2 history file that records the changes to the model 2 definition file. Then these data model instances may be migrated to become new data model instances that are supposed to be compatible with the new data model definitions for the new version of the human resources application.

Prior art modeling frameworks migrate the change from the model 1 definition file's property B for the employee's spouse's name to the property G for the employee's family members' names for the model 1 instances, and migrate the change from the model 2 definition file's property C for employer contributions to any employee-selected health insurance plans to the property F for federally-mandated employer contributions to any employee-selected health insurance plans for the model 2 instances. However, when the migrated version of the human resources application references a migrated model 2 instance, the second property for the model 2 instance references the old property B for the employee's spouse's name, not the new property G for the employee's family members' names, because the migrated model 2 instance is based on the model 2 history file, which does not include this change that was recorded in the model 1 history file. As a result, changes to the model 1 instances are properly migrated, but changes to the model 2 instances are only partially migrated.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Embodiments herein track changes to application model definitions for application model migration. A combined history file is created based on changes associated with application model definition files. In a very simple example, a tracking application creates a combined history file which includes a change in a model 1 definition file from a property B for an employee's spouse's name to a property G for an employee's family members' names. A first property for a first model definition file of the application model definition files is identified that depends on a second property for a second model definition file of the application model definition files. In a very simple example, the tracking application identifies the property B of a model 2 definition file as an extension of the property B, which was changed to the property G, of the model 1 definition file. A change for the second property is identified based on the combined history file. In a very simple example, the tracking application identifies the change to the property B of the model 1 definition file in the combined history file because the tracking application had identified that the property B of the model 2 definition file extends the property B, which was changed to the property G, of the model 1 definition file. A transformation file is constructed that includes a change for the first property based on the change for the second property. In a very simple example, the tracking application constructs a transformation file for the model 2 definition file that includes the change in the model 1 definition file from the property B for the employee's spouse's name to the property G for the employee's family members' names. As a result, changes to the model 2 instances can be properly migrated.

Figure 1:
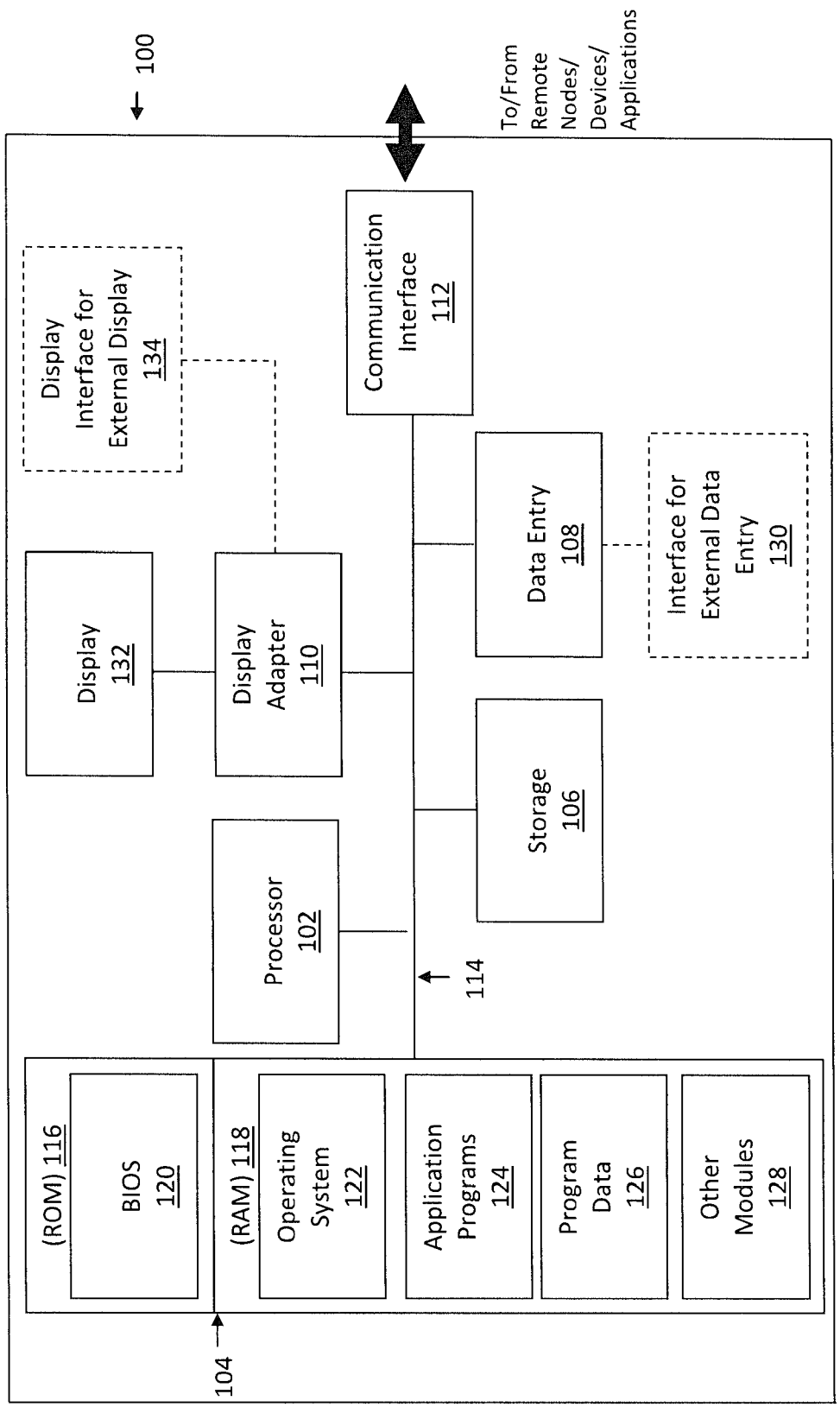
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for tracking changes to application model definitions for application model migration.

Figure 2:
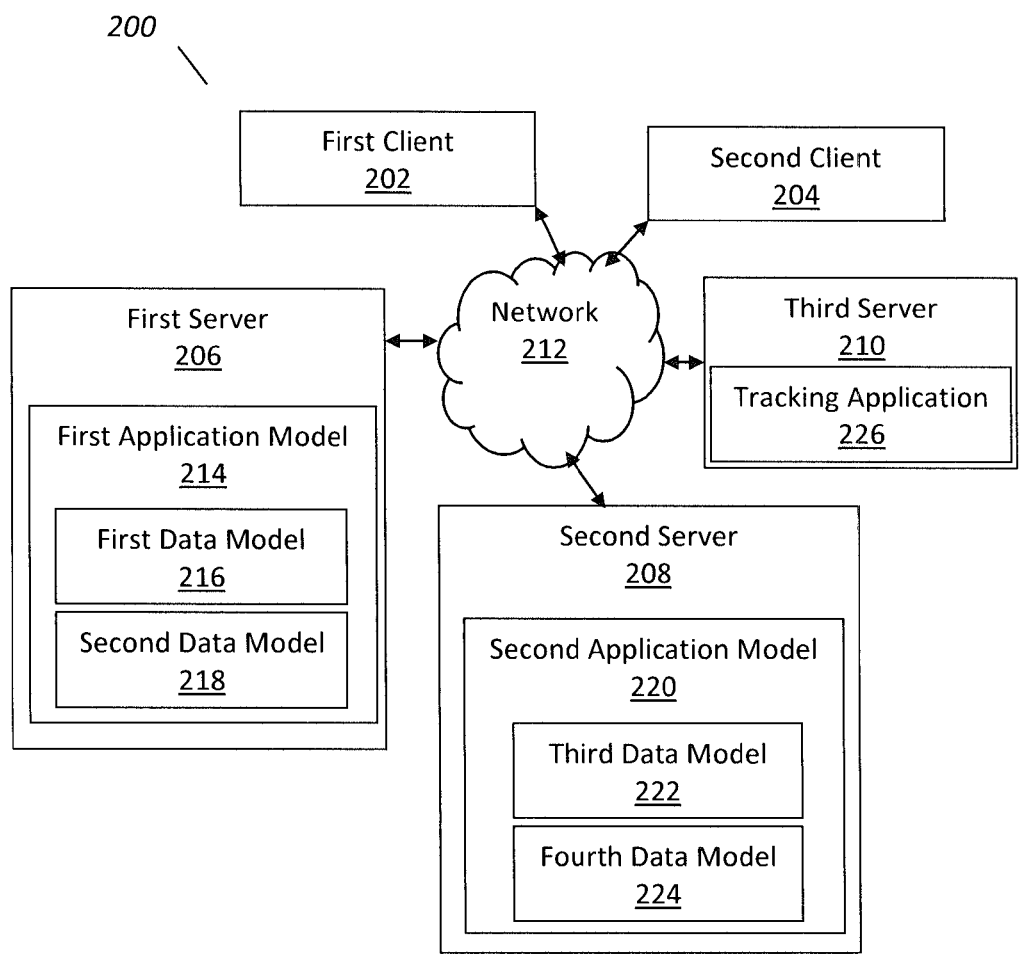
FIG. 2 illustrates a block diagram of an example system for tracking changes to application model definitions for application model migration, under an embodiment.

FIG. 2 illustrates a block diagram of a system that implements tracking changes to application model definitions for application model migration, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204; and a first server 206, a second server 208, and a third server 210 that are provided by a hosting company. The clients 202-204 and the servers 206-210 communicate via a network 212. An enterprise uses the clients 202-204 to execute an enterprise application via the servers 206-208. The first server 206 includes a first application model 214, which includes a first data model 216 and a second data model 218 for an enterprise application. The second server 208 includes a second application model 220, which includes a third data model 222 and a fourth data model 224 for an enterprise application. The third server 210 includes a tracking application 226 to track changes to application model definitions for application model migration. Although FIG. 2 depicts the system 200 with two clients 202-204, three servers 206-210, one network 212, two application models 214 and 220, four data models 216-218 and 222-224, and one tracking application 226, the system 200 may include any number of clients 202-204, servers 206-210, networks 212, application models 214 and 220, data models 216-218 and 222-224, and tracking applications 226. The clients 202-204 and the servers 206-210 may each be substantially similar to the system 100 depicted in FIG. 1.

The tracking application 226 tracks changes to each one of the model definition files for the data models 216-218 of the first application model 214. For example, the tracking application 226 records the change in the model 1 definition file from the property B for the employee's spouse's name to the property G for the employee's family members' names, and records the change in the model 2 definition file from the property C for employer contributions to any employee-selected health insurance plans to the property F for federally-mandated employer contributions to any employee-selected health insurance plans.

The tracking application 226 creates a combined history file based on changes associated with application model definition files, wherein the version of the combined history file may be identified by a namespace. For example, the tracking application 226 processes the change to the model 2 definition file, which results in the combined history file version 0.1 including the change in the model 2 definition file from the property C for employer contributions to any employee-selected health insurance plans to the property F for federally-mandated employer contributions to any employee-selected health insurance plans. Continuing this example, the tracking application 226 processes the change to the model 1 definition file, which results in the combined history file version 0.2 including the change in the model 1 definition file from the property B for the employee's spouse's name to the property G for the employee's family members' names, and the change in the model 2 definition file from the property C for employer contributions to any employee-selected health insurance plans to the property F for federally-mandated employer contributions to any employee-selected health insurance plans. Alternatively, the tracking application 226 records the changes to the model definitions files into the combined history file as the tracking application 226 identifies the changes, without the need for first recording the changes in the separate model history files, such as the model 1 history file and the model 2 history file.

Now the tracking application 226 can identify exactly which changes need to be performed in order to migrate data model instances from version 0.0 into version 0.2. All of the model definition files have unified versioning, which is a part of a namespace. Once a change is made to any model definition file, the combined history file's version is updated and all of the other model definitions are updated to the same revision. The combined history file for all changes to model definition files enables the tracking application 226, given any two points of time, to create a one-to-one transformation file between two revisions. Since the version tracking is unified among all of the data models, all changes share the same version, each data model has its revision number as part of its namespace, and the tracking application 226 has no problem in identifying a transformation starting point. The tracking application 226 does not create the model history files at once, but over some time. Whenever any change is made to any model definition file, the tracking application 226 changes all model definitions versions to a new value, similar across all model definition files.

The tracking application 226 identifies a first property for a first model definition file of the application model definition files that depends on a second property for a second model definition file of the application model definition files. For example, the tracking application 226 identifies the property B of the model 2 definition file as an extension of the property B, which was changed to the property G, of the model 1 definition file. The first property may depend on a third property for a third model definition file of the application model definition files, wherein the third property depends on the second property. For example, the tracking application 226 identifies the property B of a model 3 definition file, for health insurance plan claims, as an extension of the property B of the model 2 definition file, which is an extension of the property B, which was changed to the property G, of the model 1 definition file. The tracking application 226 recursively identifies all of the dependent data models for a given data model based on model definition files and the dependent model dependencies. Each data model can be a set of model definitions that define the data model combined with model definitions from other data models responsible for different piece of the data model. Pieces of the data model may be identified by pieces of other models and corresponding history files for the other data models. The combined history file represents a set of changes made to data models between two points of time.

The tracking application 226 identifies a change for the second property based on the combined history file. For example, the tracking application 226 identifies the change to the property B of the model 1 definition in the combined history file because the tracking application 226 had identified that the property B of the model 2 definition extends the property B, which was changed to the property G, of the model 1 definition.

The tracking application 226 constructs a transformation file that includes a change for the first property based on the change for the second property. For example, the tracking application 226 constructs a transformation file for the model 2 definition that includes the change in the model 1 definition from the property B for the employee's spouse's name to the property G for the employee's family members' names, and the change in the model 2 definition from the property C for employer contributions to any employee-selected health insurance plans to the property F for federally-mandated employer contributions to any employee-selected health insurance plans. The tracking application 226 constructs a transformation file by using dependent data models. Since all data models have unified versioning as part of their namespace, the tracking application 226 can clearly identify from which revision the migration is required, and easily create the transformation file. The resulting transformation file is a set of changes that need to be implemented for existing data model instances in order to be compatible with the migrated data model definitions. In this example, the transformation file is based on two model history files, one simple model history file for the model 1 definition file, and another one that is composed for the model 2 definition file.

The tracking application 226 may change the first property during a migration of the first model definition file to another version of an application associated with the application model definition files based on executing the transformation file. For example, the tracking application 226 changes the property B of the model 2 instances to the property G for the employee's family members' names, and changes the property C of the model 2 instances to the property F for federally-mandated employer contributions to any employee-selected health insurance plans. As a result, changes to the model 2 instances can be properly migrated when the data models 216-218 for the first application model 214 are migrated from the first server 208 to the second server 210 as the data models 222-224 for the second application model 220.

Figure 3:
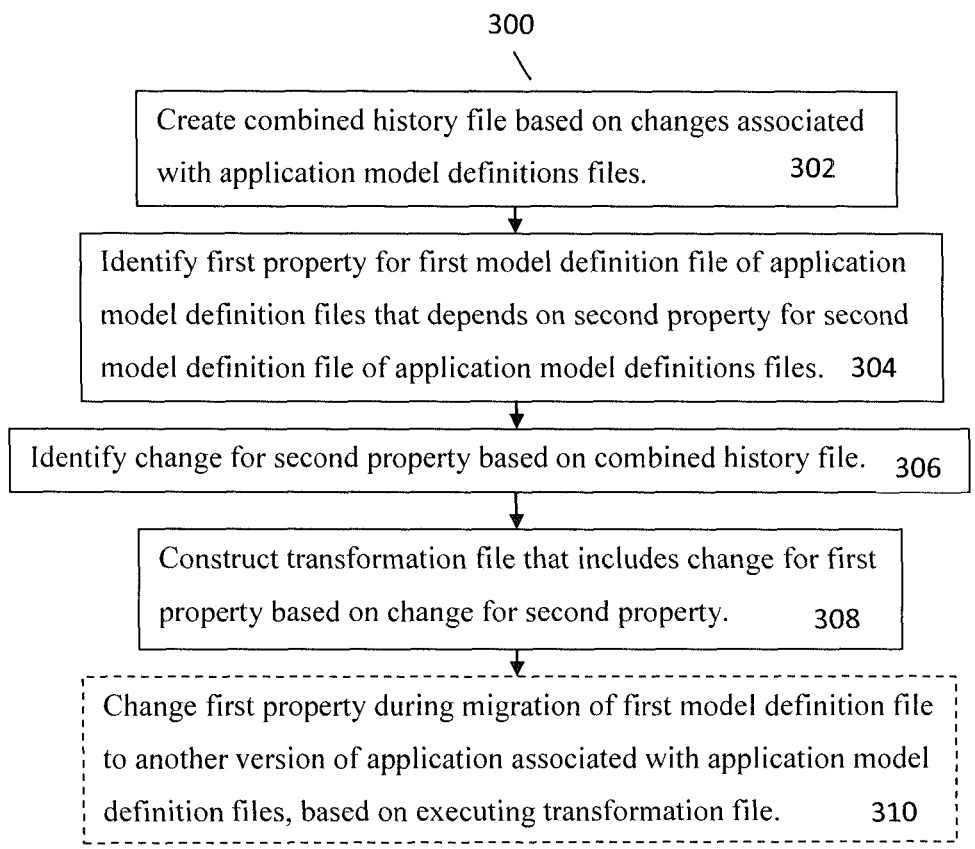
FIG. 3 is a flowchart that illustrates a method of tracking changes to application model definitions for application model migration, under an embodiment.

FIG. 3 is a flowchart that illustrates a method of tracking changes to application model definitions for application model migration. Flowchart 300 illustrates method acts illustrated as flowchart blocks for certain steps involved in and/or between the client 202-204 and/or the servers 206-210 of FIG. 2.

A combined history file is created based on changes associated with application model definition files, act 302. In a very simple example, the tracking application 226 creates the combined history file which includes the change in the model 1 definition file from the property B for the employee's spouse's name to the property G for the employee's family members' names.

A first property for a first model definition file of application model definition files is identified that depends on a second property for a second model definition file of the application model definition files, act 304. In a very simple example, the tracking application 226 identifies the property B of the model 2 definition file as an extension of the property B, which was changed to the property G, of the model 1 definition file.

A change for a second property is identified based on a combined history file, act 306. In a very simple example, the tracking application 226 identifies the change to the property B of the model 1 definition in the combined history file because the tracking application 226 had identified that the property B of the model 2 definition extends the property B, which was changed to the property G, of the model 1 definition.

A transformation file is constructed that includes a change for a first property based on a change for a second property, act 308. In a very simple example, the tracking application 226 constructs a transformation file for the model 2 definition that includes the change in the model 1 definition from the property B for the employee's spouse's name to the property G for the employee's family members' names.

A first property is optionally changed during a migration of a first model definition file to another version of an application associated with application model definition files, based on executing a transformation file, act 310. In a very simple example, the tracking application 226 changes the property B of the model 2 instances to the property G for the employee's family members' names. As a result, changes to the model 2 instances can be properly migrated when the data models 216-218 for the first application model 214 are migrated from the first server 208 to the second server 210 as the data models 222-224 for the second application model 220.

Although FIG. 3 depicts the acts 302-310 occurring in a specific order, the acts 302-310 may occur in another order. Embodiments herein enable calculating costs of application operations in a virtually provisioned environment.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for tracking changes to model definitions for migration of an application model, the system comprising:
   a processor-based application executed on a computer and configured to:
   create a version of a combined history file based on changes associated with a plurality of model definition files, the version being identified by a namespace that includes unified versioning for the plurality of model definition files, wherein the combined history file includes changes to the plurality of model definition files, each of the plurality of model definition files corresponds to one of a plurality of data models of the application model;
   identify a first property for a first model definition file of the plurality of model definition files that depends on a second property for a second model definition file of the plurality of model definition files;
   identify a change for the second property based on the combined history file; and
   construct a transformation file that includes a change for the first property based on the change for the second property.

2. The system of claim 1, wherein the version of the combined history file is updated in response to a change made to any of the plurality of model definition files.

3. The system of claim 1, wherein the plurality of changes to the plurality of model definition files are recorded in a plurality of model history files that correspond to the plurality of model definition files.

4. The system of claim 1, wherein the plurality of changes to the plurality of model definition files are recorded in the combined history file as the plurality of changes are identified.

5. The system of claim 1, wherein the first property depends on a third property for a third model definition file of the plurality of model definition files, and wherein the third property depends on the second property.

6. The system of claim 1, wherein the processor-based application executed on the computer is further configured to change the first property during a migration of the first model definition file to another version of an application associated with the plurality of model definition files, based on executing the transformation file.

7. A computer-implemented method for tracking changes to application model definitions for application model migration, the method comprising:
   creating a version of a combined history file based on changes associated with a plurality of model definition files, the version being identified by a namespace that includes unified versioning for the plurality of model definition files, wherein the combined history file includes changes to the plurality of model definition files, each of the plurality of model definition files corresponds to one of a plurality of data models of the application model; identifying a first property for a first model definition file of the plurality of model definition files that depends on a second property for a second model definition file of the plurality of model definition files;
   identifying a change for the second property based on the combined history file; and constructing a transformation file that includes a change for the first property based on the change for the second property.

8. The computer-implemented method of claim 7, wherein the version of the combined history file is updated in response to a change made to any of the plurality of model definition files.

9. The computer-implemented method of claim 7, wherein the plurality of changes to the plurality of model definition files are recorded in a plurality of model history files that correspond to the plurality of model definition files.

10. The computer-implemented method of claim 7, wherein the plurality of changes to the plurality of model definition files are recorded in the combined history file as the plurality of changes are identified.

11. The computer-implemented method of claim 7, wherein the first property depends on a third property for a third model definition file of the plurality of model definition files, and wherein the third property depends on the second property.

12. The computer-implemented method of claim 7, wherein the method further comprises changing the first property during a migration of the first model definition file to another version of an application associated with the plurality of model definitions file, based on executing the transformation file.

13. A computer program product, comprising a non-transitory computer-readable medium having a computer-readable program code embodied therein, the computer-readable program code adapted to be executed by one or more processors to implement a method, the method comprising:

create a version of a combined history file based on changes associated with a plurality of model definition files, the version being identified by a namespace that includes unified versioning for the plurality of model definition files, wherein the combined history file includes changes to the plurality of model definition files, each of the plurality of model definition files corresponds to one of a plurality of data models of the application model; identify a first property for a first model definition file of the plurality of model definition files that depends on a second property for a second model definition file of the plurality of model definition files;

identify a change for the second property based on the combined history file; and construct a transformation file that includes a change for the first property based on the change for the second property.

14. The computer program product of claim 13, wherein the version of the combined history file is updated in response to a change made to any of the plurality of model definition files.

15. The computer program product of claim 13, wherein the plurality of changes to the plurality of model definition files are recorded in a plurality of model history files that correspond to the plurality of model definition files.

16. The computer program product of claim 13, wherein the plurality of changes to the plurality of model definition files are recorded in the combined history file as the plurality of changes are identified.

17. The computer program product of claim 13, wherein the first property depends on a third property for a third model definition file of the plurality of model definition files, and wherein the third property depends on the second property.

18. The computer program product of claim 13, wherein the method further comprises changing the first property during a migration of the first model definition file to another version of an application associated with the plurality of model definition files, based on executing the transformation file.

* * * * *